United States Patent [19]

Ito et al.

[11] 4,437,341

[45] Mar. 20, 1984

[54] APPARATUS FOR MEASURING AN INJECTION AMOUNT

[75] Inventors: Shinzo Ito, Aichi; Tateshi Kato, Anjo; Takumi Noma, Okazaki; Soichiro Sugimoto, Okazaki; Seigi Toiyama, Okazaki, all of Japan

[73] Assignee: Nippondenso Co., Ltd., Kariya, Japan

[21] Appl. No.: 369,427

[22] Filed: Apr. 19, 1982

[30] Foreign Application Priority Data

Apr. 21, 1981 [JP] Japan ................................. 56-60414

[51] Int. Cl.³ .......................................... G01M 15/00
[52] U.S. Cl. ................................................... 73/119 A
[58] Field of Search ..................... 73/119 A, 249, 239, 73/232; 251/210

[56] References Cited

U.S. PATENT DOCUMENTS 4,244,398 1/1981 Tengan ........................... 251/210 X
4,328,697 5/1982 Tumber et al. ............... 73/119 A X Primary Examiner—Jerry W. Myracle
Attorney, Agent, or Firm—Cushman, Darby & Cushman

[57] ABSTRACT

A liquid injection regulator for use in an injection amount measuring apparatus has seal sections for sealing an injection chamber to be charged with fuel oil and a fuel oil discharge port, respectively, and a control valve having portions thereof which constitute parts of the two seal sections. The control valve departs from the injection chamber to release the two seal sections to thereby discharge the liquid and after completion of the discharge of liquid, returns to the liquid injection chamber while sealing the liquid discharge port to thereby raise pressure in the liquid injection chamber.

1 Claim, 6 Drawing Figures

APPARATUS FOR MEASURING AN INJECTION AMOUNT

BACKGROUND OF THE INVENTION

This invention relates to a liquid injection regulator having a control valve mainly used for an apparatus for measuring an injection amount from an injection pump which is used for fuel oil injection into an internal combustion engine especially a Diesel engine, and a measuring apparatus utilizing the liquid injection regulator.

The injection amount measuring apparatus is employed for adjusting and inspecting the injection pump in its manufacturing factories and service stations etc. In a conventional injection amount measuring apparatus, pressure within an injection chamber is previously raised by a pressure raising device before an injection device under measurement is operated for injection following discharging fuel oil from the injection chamber, and thereafter the fuel oil is injected. The pre-loading of the pressure is made to solve the following problem. There is a large difference between the pressure within the injection chamber before injection and the pressure after injection. Therefore, an increase of the volume resulting from the injection in the injection chamber is reduced by the amount corresponding to an amount of a compressed volume due to the pressure difference, so that the measured injection amount becomes smaller than an actual injection amount by the reduced amount of the volume increase.

In measuring the injection amount, an amount of liquid such as fuel oil is injected from the injection device under measurement into the injection chamber to cause an increase of volume of the injection chamber, and the injection amount is measured by measuring a displacement of a displacement member caused by the increase of the volume of the injection chamber, and in the conventional apparatus it is necessary to provide a separate pressure raising device, resulting in complexity of the apparatus construction.

SUMMARY OF THE INVENTION

It is therefore an object of the present invention to provide an improved liquid injection regulator which has two seal sections for sealing a liquid injection chamber and a liquid discharge port, respectively, and a control valve having portions thereof which constitute parts of the two seal sections which control valve departs from the liquid injection chamber to release the two seal sections to thereby discharge the liquid and returns to the liquid injection chamber while sealing the liquid discharge port and thereby raise internal pressure in the liquid injection chamber.

Another object of the invention is to provide a simplified injection amount measuring apparatus utilizing the liquid injection regulator which can attain an effect comparable to that of the conventional apparatus without resort to any separate pressure raising device.

According to this invention, the liquid injection regulator has a discharge function to discharge liquid in the injection chamber to the outside after completion of injecting by an injection device under measurement, and a pressure raising function to raise pressure within the injection chamber by utilizing a first seal section which effects oil-tight sealing when the control valve slides upon closure and a second seal section which effects stationary oil-tight sealing. Accordingly, the control valve of this invention can be controlled by an electrical signal without resort to any separate pressure raising device, thereby making it easy to attain compatibility with different injection timings of a fuel injection pump.

DESCRIPTION OF PREFERRED EMBODIMENTS

The present invention will now be described in detail by using embodiments thereof.

Figure 1:
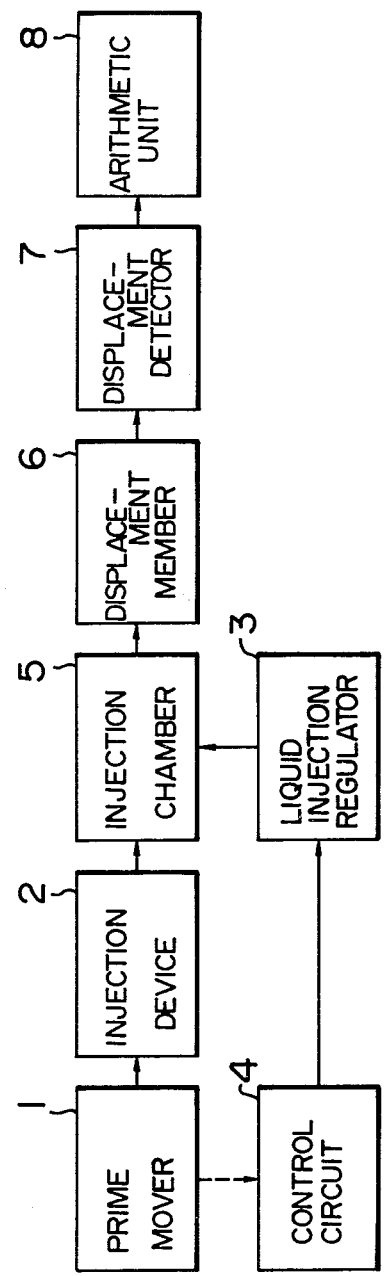
FIG. 1 is a block diagram illustrating an overall construction of an apparatus for measuring an injection amount from an injection device according to the invention.

Referring to FIG. 1 showing, in schematic block form, an overall arrangement incorporating a measuring apparatus according to the invention, a prime mover 1 comprising a motor drives an injection device under measurement. A control circuit 4 controls a liquid injection regulator 3 in response to the rotation angle of the prime mover 1, the regulator 3 having a control valve adapted to discharge fuel oil from an injection chamber 5 for measurement and to raise pressure in the injection chamber 5 after discharging the fuel oil. A displacement member 6 displaces in accordance with a change in volume of the injection chamber 5, a displacement detector 7 converts the displacement of the displacement member 6 into an electrical quantity, and an arithmetic unit 8 arithmetically processes the electrical output from the displacement detector 7 to determine an injection amount, namely, a charged amount of fuel oil for display thereof.

Figure 2:
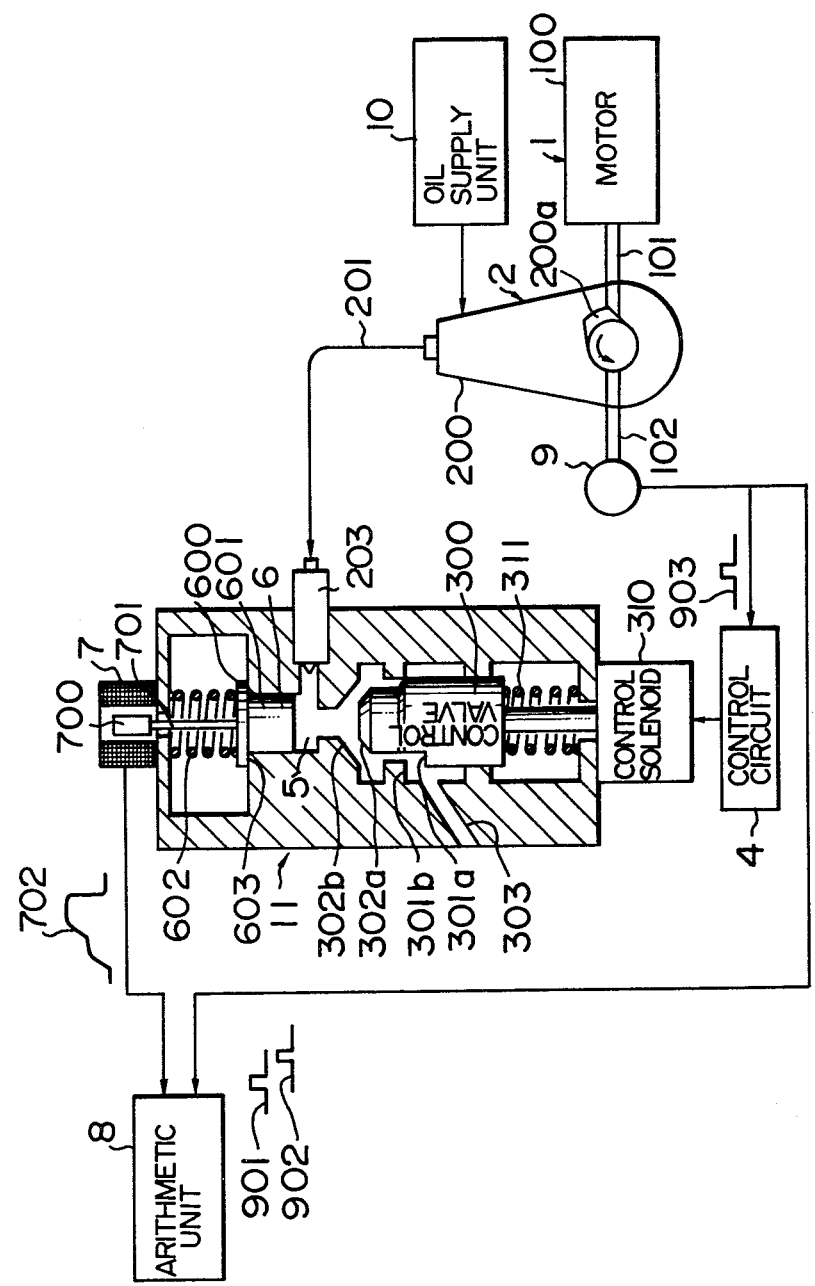
FIG. 2 is a longitudinal sectional view of a major portion illustrating an embodiment of the measuring apparatus according to the invention.

Exemplified in FIG. 2 is the apparatus outlined in FIG. 1. In FIG. 2, the prime mover 1 is comprised of a motor 100 and shafts 101 and 102. The injection device 2 under measurement has an injection pump under measurement 200 used as a fuel injection pump for a Diesel engine, an injection pipe 201, and an injection nozzle 203 for injecting fuel oil into the injection chamber 5. The injection pump 200 which is measured is operated by a cam 200a rotating with the shafts 101 and 102.

The regulator 3 comprises a control valve 300, a first seal (oil-tight) section 301 including first seal members 301a and 301b, a second seal section 302 including second seal members 302a and 302b, a spring 311 for pushing up the control valve 300, a solenoid 310 for attracting the control valve 300, and an oil discharge conduit 303. The control circuit 4 is a drive circuit which drives the control solenoid 310 in response to a rotation signal generated from a pulse generator 9 coupled to the shaft 102. The displacement member 6 comprises a stopper flange 600 which abuts on an end surface 603 surrounding a hole for slidably receiving a piston 601 of the displacement member 6. The displacement detector 7 has a differential transformer for generating an electrical signal (voltage) in accordance with a position of a movable core 700 which is coupled with the piston 601 by means of a shaft 701.

The arithmetic unit 8 receives the electrical signal from the displacement detector 7, that is, an electrical signal 702 representing an amount of displacement of the displacement member 6, and pulse signals 901 and 902 which are generated by the rotary pulse generator 9 at predetermined first and second rotating positions of the shafts 101 and 102 to represent start and end timings of the measurement, and then performs a given arithmetic operation to measure an injection amount of fuel oil in digital fashion and to display the result.

Any known pulse generator of this type may be used for the rotary pulse generator 9. The pulse signals may also be generated, for example, by an optical method in which light is intermittently applied to a photoelectric element by a slitted disc rotating with the shafts 101 and 102. Reference numeral 10 denotes an oil supply unit for supplying fuel oil to the injection pump 200, and 11 a body of the measuring apparatus which houses the injection chamber 5 and supports individual components as mentioned above.

Figure 3:
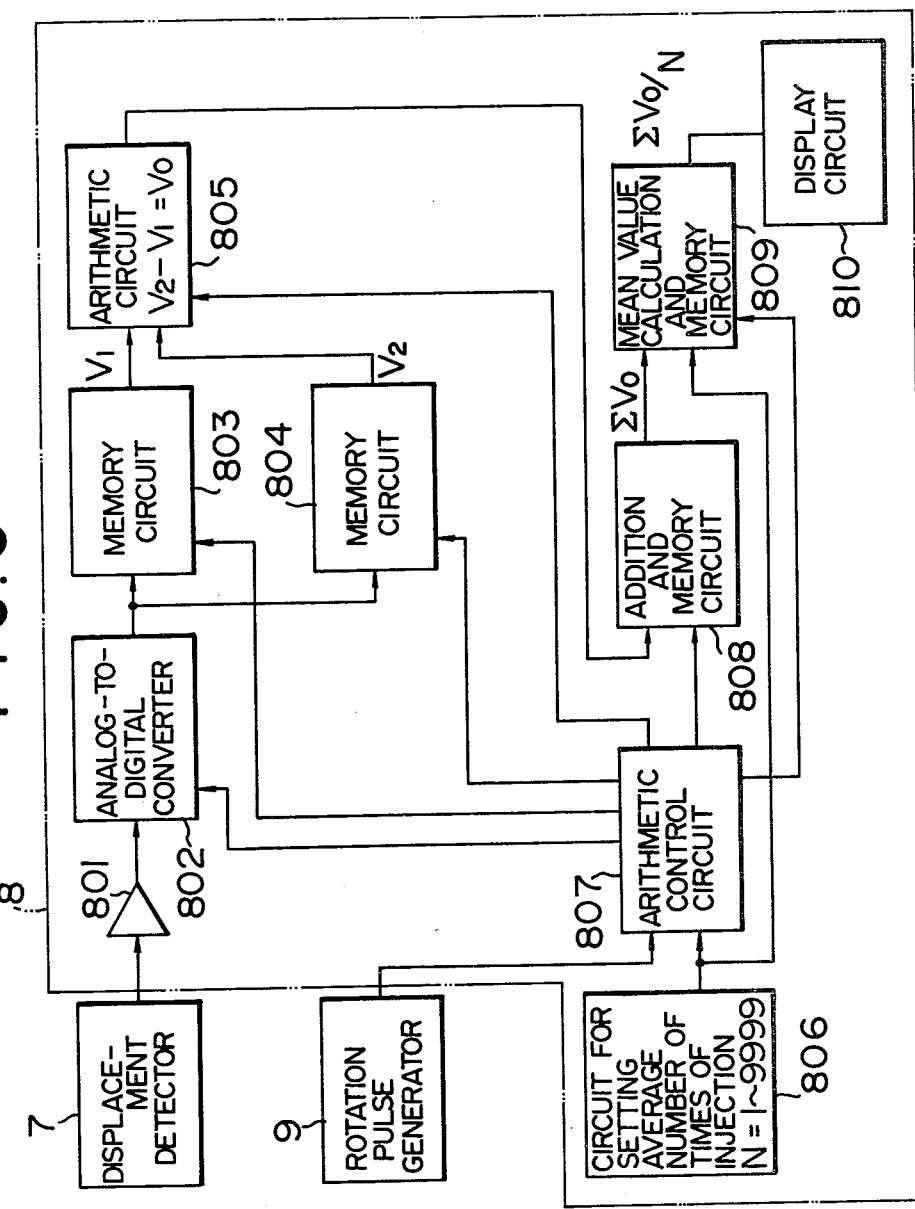
FIG. 3 is a block diagram illustrating an arrangement of an arithmetic unit shown in FIG. 2.

Illustrated in FIG. 3 is a basic construction of the arithmetic unit 8 which comprises an amplifier 801, an analog-to-digital converter 802 (hereinafter referred to as A/D converter), memory circuits 803 and 804, an arithmetic circuit 805, a circuit for setting average number of times of injection 806 in which it is possible to set any number from 1 to 9999 manually, an arithmetic control circuit 807, an addition and memory circuit 808, a mean valve calculation and memory circuit 809, and a display circuit 810.

The movement of the control valve 300 is determined by force fa of a spring 602, force fb of the spring 311, and attraction force fc of the control solenoid 310.

Resultant force F (positive when acting downwards) is:

$$F = fa + fb + fc$$

and the control valve moves downwards when the force F is positive and upwards when negative.

Direction and magnitude of the force fa, fb or fc are related as follows:

$$fa > 0, fb < 0, fc > 0,$$

$$|fb| > |fc|,$$

$$fb + fc < fa,$$

$$|fb| > fa,$$

$$fa + fb + fc > 0.$$

Figure 4:
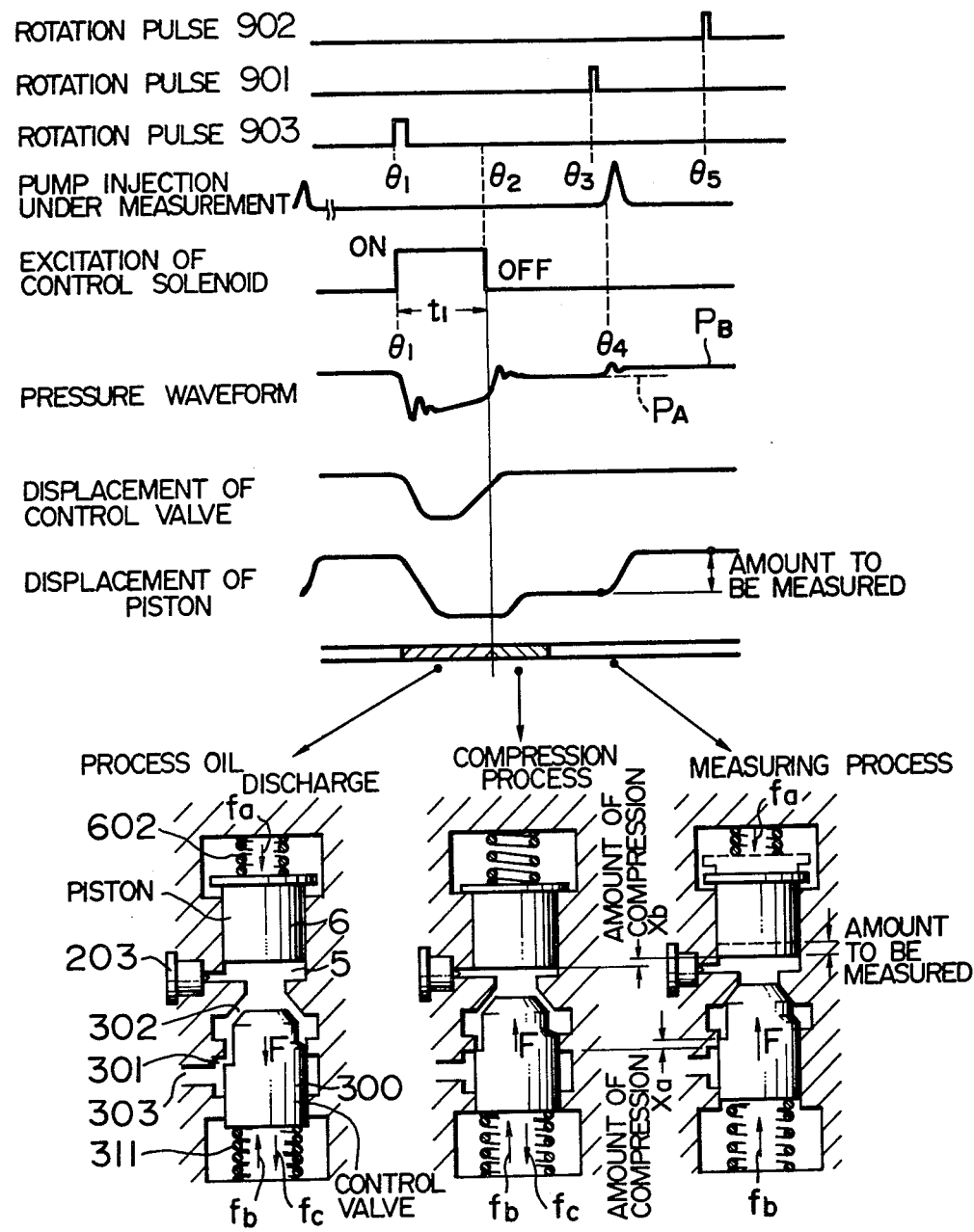
FIG. 4 illustrates waveforms useful in explaining the operation of the measuring apparatus according to the invention.

Sequential processes of the operation of the present apparatus having the construction explained thus far will be described with reference to FIG. 4. The motor 100 of the prime mover 1, having the shafts 101 and 102, drives the cam 200a and the rotary pulse generator 9 for their rotation. When the shaft rotating angle first reaches a predetermined value $\theta_1$ which is adapted for start of oil discharge, a rotation pulse 903 is generated so that the control circuit 4 excites the control solenoid 310. Consequently, the control valve is attracted downwards by the force fc and the sum of the forces fa, fb and fc becomes negative, and the resultant force moves the control valve 300 downwards, with the first and second seal sections 301 and 302 released and fuel oil charged in the injection chamber 5 discharged to the outside through the seal sections 301 and 302 and oil discharge conduit 303. Thus, upon discharge of the charged fuel oil, the control valve 300 departs downwards from the injection chamber 5. When the flange stopper 600 abuts against the end surface 603 following the completion of the oil discharge, the force fa of the spring 602 becomes zero to make the resultant or sum force F negative, thereby causing the control valve to start rising. In this manner, the oil discharge process has finished. The control valve 300 rises with a response characteristic determined by a magnitude of the force F, a mass mc of the control valve and a spring constant kc of the oil discharge spring 311 to reach the first seal section 301 at which the shaft rotation angle assumes $\theta_2$. The time ranging from the generation of the rotation pulse 903 to the occurrence of $\theta_2$ is substantially constant, amounting to $t_1$ms. When the control valve reaches the first seal section 301, the measurement chamber 5 is sealingly closed and a further upward movement of the control valve 300 increases pressure in the chamber 5. At the termination of t1 ms from the generation of the rotation pulse 903, the control circuit 4 deenergizes the control solenoid 310, thus making the force fc zero. As a result, the upward force fb+fc becomes greater than the spring force fa and the control valve rises rapidly until the second seal section 302 is closed.

Then, the volume of the injection chamber is increased by a volume equivalent to a product Sa.Xa, where Xa is an upward movement for compression and Sa a cross-sectional area of the control valve 300, so as to raise the piston 601 by Xb and increase pressure in the injection chamber 5 by PA. The Xb is expressed as, $$Xb = (Sa \cdot Xa / Sb)$$

where Sb is a cross-sectional area of the piston. The compression process in preparation for the measurement has thus finished.

Subsequently, when the shaft rotating angle reaches a predetermined value $\theta_3$ immediately before the injection, the rotary pulse generator 9 generates the rotation pulse 901 which in turn is transferred to the arithmetic control circuit 807 of the arithmetic unit 8. At this time, the compressive operation of the control valve 300 causes the piston 601 to displace and the displacement detector 7 to produce an output voltage $V_1$. The arithmetic control circuit 807 then operates to store a digital signal representing the output voltage $V_1$ from the displacement detector 7 into the memory circuit 803 by means of the rotation pulse 901. At the shaft rotation angle $\theta_4$ for injection start which is slightly progressed relative to the $\theta_3$, the cam 200a operates the injection pump 200 under measurement to inject the fuel oil into the injection chamber 5 through the injection nozzle 203, thereby charging the chamber with the fuel oil. As the result of the injection of the oil from the injection pump 200, the pressure in the injection chamber rises to a pressure $P_B$ shown in FIG. 4. With increase of the volume within the injection chamber 5, the piston 601 displaces and the displacement detector 7 produces an output voltage $V_2$. When the shaft rotation angle comes to $\theta_5$ at which the piston assumes a normal position following the injection, the rotary pulse generator 9 generates the rotation pulse 902 which in turn is inputted into the arithmetic control circuit 807 of the arithmetic unit 8. Upon receipt of the pulse, the arithmetic control circuit 807 operates to store a digital signal representing the output voltage $V_2$ into the other memory circuit 804. Then, the arithmetic circuit 805 calculates a difference $V_0$ between $V_2$ and $V_1$, $V_2-V_1=V_0$, to find an injection amount of fuel oil per injecting and to apply the difference $V_0$ to the addition and memory circuit 808.

The measuring process has thus finished.

With the rotation of the shafts 101 and 102 of the prime mover 1, the above-mentioned discharge process, compression process (measuring preparation process) and measuring process, making up one cycle of the processes, are sequentially repeated. In the arithmetic unit 8, each output $V_0$ of the arithmetic circuit 805 is repeatedly added by N times, which are set by the circuit 806 for setting the average number of injectings, and the sum of the voltages $V_0$ is stored in the addition and memory circuit 808. The output of $\Sigma V_0$ from the addition and memory circuit 808 is stored in the mean calculation and memory circuit 809 and is divided by the number of times N to calculate the mean injection amount of fuel oil for the N-times of injectings. The mean injection amount of fuel oil is displayed by the display circuit 810 digitally.

Figure 5A:
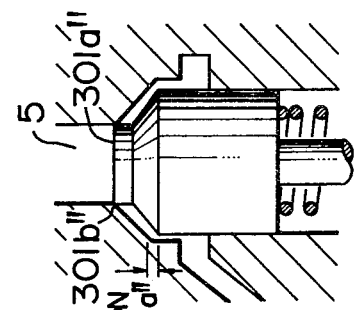
FIGS. 5A and 5B are fragmentary sectional views illustrating modified embodiments of a liquid injection regulator used in the measuring apparatus according to the invention.
Figure 5B:
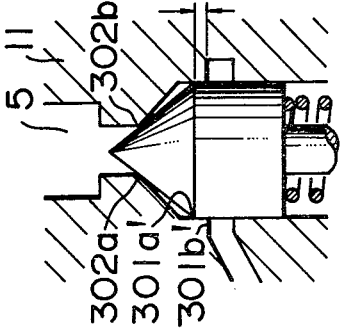

FIGS. 5A and 5B show modifications of the liquid injection regulator 3 used in the apparatus of FIG. 2. In these modifications, the structure of first and second seal sections 301 (301a and 301b) and 302 (302a and 302b) is altered. Specifically, FIG. 5A illustrates a simplified structure of the regulator 3 wherein first seal members 301a' and 301b', which correspond to the first seal section 301, and second seal members 302a' and 302b', which correspond to the second seal section 302, are established at the fore end surface of a control valve 300. In a modified embodiment as shown in FIG. 5B, a first seal section including seal members 301a'' and 301b'' is arranged above a second seal section 302.

Although in the previous embodiments the oil discharge is started by exciting or energizing the solenoid, the starting of oil discharge may be done by deenergizing the solenoid if the direction of excitation or exciting current of the solenoid is reversed and the relation fa>fb is established between force fa of the piston spring 602 and force fb of the oil discharge spring 311. In this case, fa>fb fa<fb+fc stand.

Further, although in the previous embodiments the solenoid is deenergized at the termination of the timing pulse of $t_1$ ms, the deenergization of the solenoid may be effected after lapse of a corresponding time following the completion of oil discharge or at the timing of the rotation angle $\theta_2$ of the shaft 102.

We claim:

1. An apparatus for measuring an injection amount comprising:
    an injection chamber to be charged with liquid injected from an injection device under measurement;
    a prime mover for driving the injection device;
    a liquid injection regulator operable in response to the rotation angle of a shaft of the prime mover, said liquid injection regulator having two seal sections for sealing said injection chamber and a liquid discharge port, respectively, and a control valve, said control valve having portions thereof which constitute parts of the two seal portions, wherein when discharging the liquid, said control valve departs from said injection chamber to release said two seal sections to thereby connect the injection chamber to the discharge port and after completion of the discharge of liquid, returns to said liquid injection chamber while sealing said liquid discharge port to thereby raise pressure in said injection chamber;
    a displacement member which displaces in accordance with a change in the volume of said injection chamber;
    a displacement detector which converts a displacement of the displacement member into an electrical signal; and
    an arithmetic unit which arithmetically processes the electrical signal from the displacement detector to display an injection amount of the liquid injected from the injection device under measurement.

* * * * *